Aug. 19, 1952  H. ALLEN  2,607,557
VALVE
Filed Oct. 18, 1945  4 Sheets-Sheet 2

HERBERT ALLEN
INVENTOR
BY J. Vincent Martin
and
Ralph R. Browning
ATTORNEYS

Aug. 19, 1952          H. ALLEN          2,607,557

VALVE

Filed Oct. 18, 1945          4 Sheets-Sheet 3

HERBERT ALLEN
INVENTOR

BY *J. Vincent Martin*
*and*
*Ralph R. Browning*

ATTORNEYS

Patented Aug. 19, 1952

2,607,557

UNITED STATES PATENT OFFICE 2,607,557

VALVE

Herbert Allen, Houston, Tex., assignor to Cameron Iron Works, Houston, Tex., a corporation of Texas Application October 18, 1945, Serial No. 623,000

13 Claims. (Cl. 251—97)

This invention relates in general to valve actuators and more particularly has reference to a device for actuating plug-type valves in which the plug is unseated prior to rotation thereof.

Quite often valves of the plug type have the plug or valve body thereof jammed in either an open or closed position especially if the plug has been in this position for a long period of time, and quite often purposely to effect a seal. To rotate the plug to a different position considerable effort must be applied to the jammed plug to effect the breaking away of the plug from its seat and the rotation thereof.

An object of this invention is to provide an actuator for plug-type valves which will remove the plug from its seat and subsequently effect rotation of the plug to a different position.

Another object of this invention is to provide an actuator for plug-type valves which is effective for unseating the valve plug, rotating the same to a different position and for again tightly pressing the plug on its seat in said different position.

Still another object of this invention is to provide an actuator for a plug-type valve which is effective for unseating the valve plug, rotating the same to a different position and for again tightly pressing the plug on its seat in said different position and in which the plug is prevented from rotating during its seating motion.

With these and other objects in view the present invention comprises an actuator for the plug of a plug-type valve which is rotatable about an axis concentric with that of the plug and is fixed against axial displacement. A thread connection is provided between the actuator and the plug whereby rotation of the actuator will first cause axial movement of the plug away from its seat and after the plug has been raised sufficiently, will effect rotation of the plug to a desired position. A mechanism is associated with the plug to prevent rotation of the plug upon rotation of the actuator in the opposite direction whereby upon rotation of the actuator in the opposite direction the plug will be moved axially toward its seat without being displaced from its new rotary position.

In order to facilitate an understanding of the present invention reference is made to the accompanying drawings.

Figure 1:
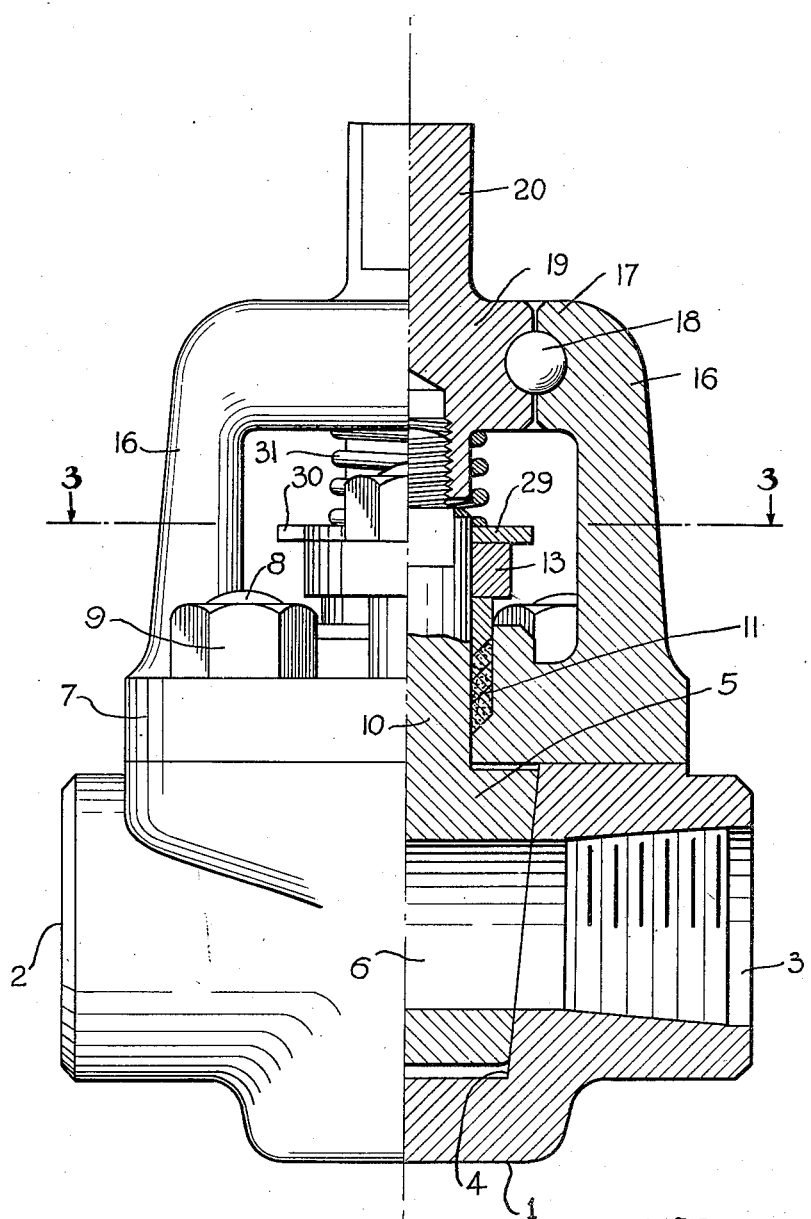
Fig. 1 is a side elevational view partly in section of a plug-type valve equipped with an actuator constructed in accordance with the present invention.
Figure 2:
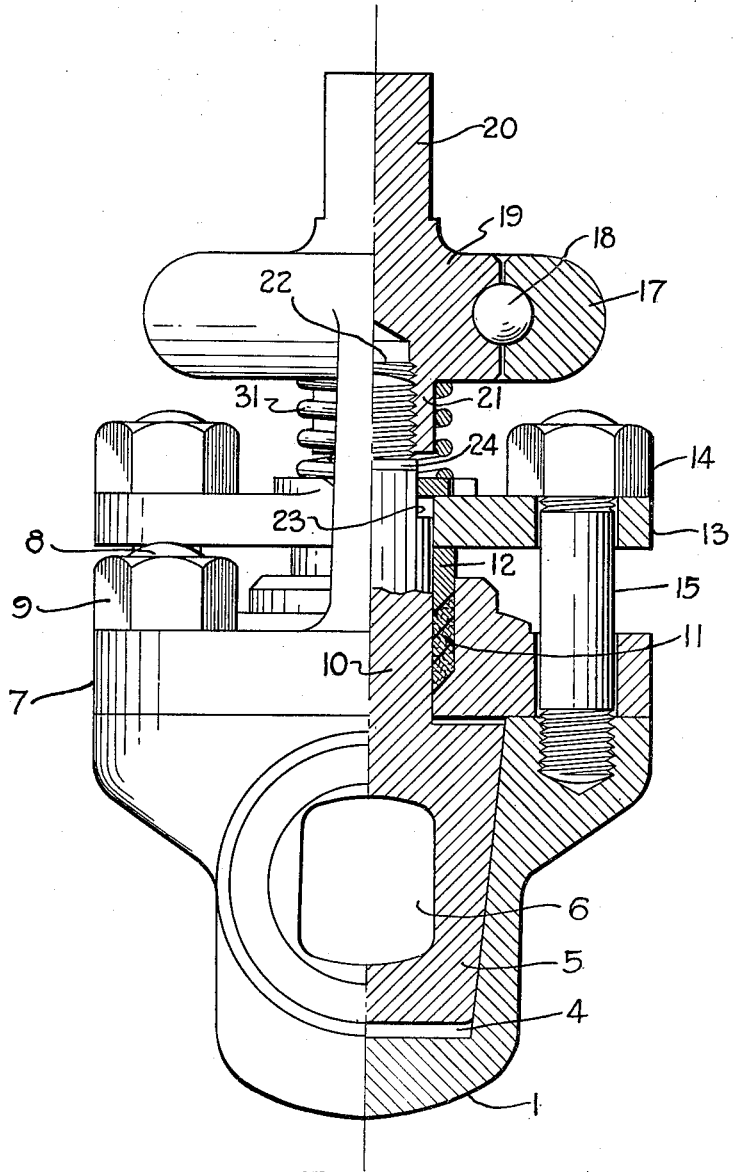
Fig. 2 is an end elevational view of the valve shown in Fig. 1 with parts in section.

As before stated, the present invention comprises an actuator for an ordinary type of plug valve operable to first move the plug axially to free it from its seat and permit it to be easily turned. In the drawings, a plug-type valve is shown equipped with the actuator of this invention. The plug valve comprises a casing 1 having inlet and outlet ports 2 and 3 either of which may serve as the inlet or outlet depending upon the direction of fluid flow through the same. These ports may be threaded as shown or otherwise formed for coupling to flow conduits.

A frusto-conical bore is formed in the valve casing 1 and serves as a seat 4 for the tapered plug 5. As shown, the plug has a flow duct 6 therethrough which may be brought into register with the ports 2 and 3 to open the valve, or moved to other positions to partially or completely close off the flow of fluid through the valve. The upper portion of the valve casing 1 is closed by a cap or bonnet 7 which is secured in place by studs 8 and nuts 9 or other suitable means.

Plug 5 has a stem 10 extending axially therefrom up through an opening in the bonnet 7. The upper portion of the opening through which the stem 10 extends is enlarged to receive packing 11 which is compressed by an annular ram 12, forced downwardly by the cross plate 13 which in turn is clamped toward the bonnet 7 by nuts 14 threaded on elongated studs 15 carried by the casing 1 and projecting through openings in said bonnet.

In accordance with the present invention the bonnet 7 is constructed with or fitted with upstanding risers 16 which carry an annular bearing member 17. As shown the risers 16 and annular member 17 are integral but obviously may be assembled of separate parts. Bearing member 17 may be formed with a race to receive balls 18 which cooperate with a race on the outer periphery of a rotary actuator member 19. This construction serves to mount the actuator 19 coaxially with the plug 5 for rotary movement but retains the actuator effectively against axial movement. Extending upwardly from the actuator 19 is a stem 20 which is shaped to receive a wheel, wrench or other means for rotating the actuator.

A boss 21 extends axially downwardly from the actuator 19 which is provided with a threaded socket 22 coaxially thereof.

Stem 10 of the plug 5 is provided with a non-circular portion 23 and with a shank 24 of reduced diameter which is threaded to enter the threaded socket 22. The juncture of the stem 10 and shank 24 provides a shoulder 25 which cooperates with the lower edge of the boss 21 to limit relative rotation of the shank and socket in a direction for threading the shank into the socket.

On the upper portion of the cross plate 13 there is provided a series of annularly arranged elements 26 of a construction similar to ratchet teeth. In the drawings four of the ratchet-teeth-like elements are shown but obviously any desired number may be used. These elements are concentrically disposed about the axis of the stem 10, with the inner edges thereof forming a broken cylindrical surface of a diameter greater than that of the opening in the plate 13 through which the stem 10 extends. It will be noted that one end of each of the teeth or elements 26 is inclined as indicated by reference character 27 and that the other end thereof is formed with an abrupt shoulder 28.

Figure 3:
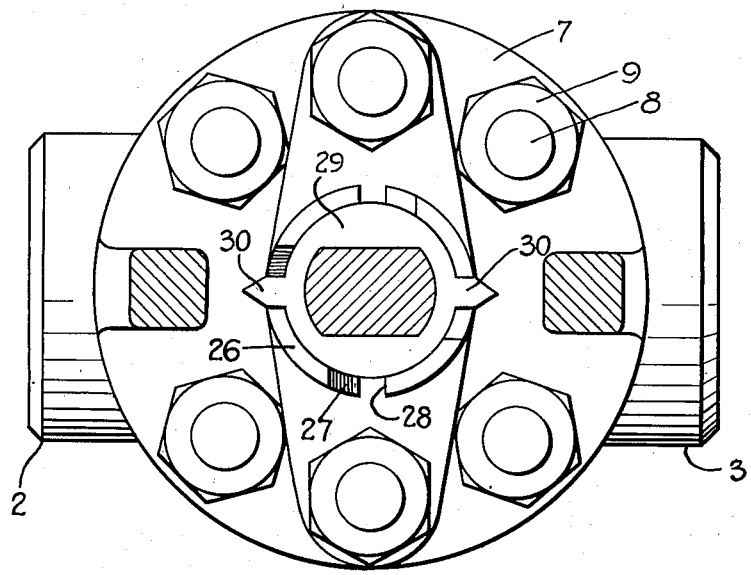
Fig. 3 is a section taken substantially on line 3—3 of Fig. 1.
Figure 4:
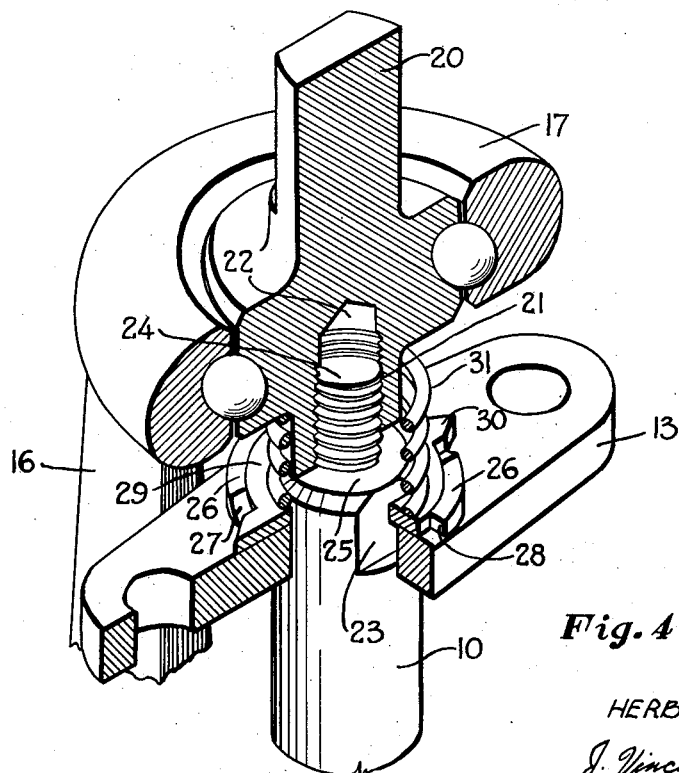
Fig. 4 is an axial vertical sectional view through the actuator portion of the valve.

An annular disc 29 provided with a non-circular opening is mounted on the non-circular portion 23 of the stem 10. The external diameter of this disc is such that it is loosely received within the annularly disposed series of ratchet teeth 26 on the upper surface of the plate 13. One or more pawls 39 are carried by the disc 29. In the form of invention shown in the drawings, two pawl arms 30 extend diametrically from the periphery of the disc as is most clearly shown in Fig. 3. Disc 29 is axially movable and non-rotatable relative to stem 10. The spacings between the teeth elements 26 and the width of pawls 30 are such that the pawls will seat between adjacent teeth. Teeth 26 are in such number and are so spaced that when the pawls 30 are seated between one set of adjacent teeth the valve plug will be in "open" position and when seated in spaces between the other set of adjacent teeth will be in the "closed" position. Under these circumstances the pawls 30 will serve as indicators to indicate the position of the plug 5. When the valve is installed with the stem 10 in the vertical position above the plug 5 as shown, the disc 29 will seat by gravity. A spring 31 interposed between the under side of the actuator 19 and the upper side of the disc 29 is provided to press the disc against the plate 13 regardless of the position of installation of the valve. This spring action causes the pawls to snap over the shoulder 28 with an audible click as the disc seats against plate 13. This audible means facilitates positive operation of the valve in darkness.

The above described pawl and ratchet construction serves to permit rotation of plug 5 in one direction in which instance the pawls ride up on the inclined surfaces 27 of the teeth 26 and to prevent reverse rotation in which instance the pawls will abut the shoulders 28.

In operation the actuator 19 is rotated in a direction to cause the threaded shank 24 on the valve stem 10 to be drawn up into the threaded socket 22 carried by the actuator. It is most likely that the plug 5 is jammed or stuck on its tapered seat and under these circumstances the plug will not rotate with the actuator until free of the seat but will be drawn axially towards the actuator thereby breaking the plug loose from its seat. If after the plug 5 is broken loose from its seat there is sufficient friction to prevent its rotation, the threaded shank 24 will be drawn into the socket 21 until the lower edge of the socket abuts the shoulder 25 then further rotation of the actuator will positively produce rotation of the plug 5. The construction of the pawl disc and its mounting on the valve stem and the shape of the teeth enable the pawls to ride over the teeth.

In rotating the plug to an adjusted position when it has reached such position the pawls 31 will drop down into the space between adjacent teeth 26 and produce a sound which the operator will recognize and thereby know that the valve plug has reached the desired position. After the plug has been rotated to a desired position as indicated by the pawl-indicator 30, the actuator is rotated in the reverse direction. Since the plug 5 cannot be rotated in the reverse direction by virtue of the pawls 30 engaging the shoulders 28 of the ratchet teeth 26, the reverse rotation of the actuator will force the threaded shank 24 out of the socket 22. Due to the mounting of the actuator against axial movement, the unthreading of the shank 24 from the socket 22 will axially displace the plug 5 and force it onto its seat to effectively seal it in its adjusted position.

Plug 5 may be loosened from its seat, rotated and again pressed into its seat in the above described manner to adjust it from open to closed positions and to adjust it from closed to open positions. In each instance the adjustment is effected by rotating the plug in the same direction, it being held against reverse rotation by the pawl and ratchet arrangement.

Figure 5:
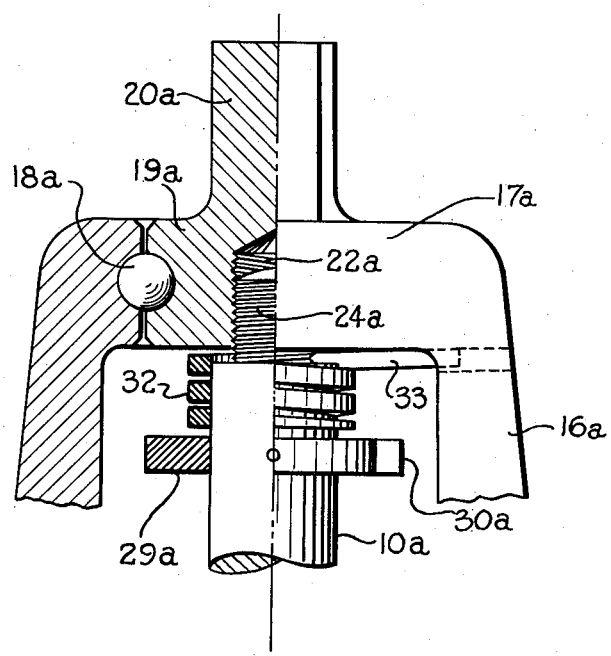
Fig. 5 is a fragmentary side elevational view of a portion of a valve and the actuator being shown partly in section.

A modified form of valve actuator is shown in Fig. 5. Elements shown in this figure identical to those shown in Figs. 1-4 have been indicated by similar reference characters. The form of construction shown in this figure differs from that of the other figures in that a different form of mechanism is provided to constrain rotation of plug stem 10a to one direction. In the device of Fig. 5 the disc 29a is fixed to stem 10a and is provided with an indicator 30a. This disc and indicator pointer serve merely as a means to show the position of the plug integral with stem 10a. A helical coil spring 32 is tightly wrapped about stem 10a. One end 33 of this coil is fixed to the riser 16a and the other end is free. Coil 32 is so wrapped about stem 10a that when actuator 19a is rotated to cause threaded shank 24a to be drawn up into the socket 22a the frictional engagement between the stem 10a and the coil spring tends to unwrap the spring which reduces the friction between the spring and the stem permitting rotation of the later.

Upon rotating the actuator 19a in a direction to unthread the shank 24a from the socket 22a, the frictional engagement between the free end of spring 32 tends to wrap the spring more tightly about the stem, still further increasing the friction between the spring and stem to prevent rotation of the stem. Apart from the different form of clutch or ratchet this form of invention is the same as that of Figs. 1-4 and operates in the same manner.

From the foregoing it will be appreciated that the present invention provides a simple and effective actuator for plug-type valves.

Having described my invention, I claim:

1. A plug valve comprising a valve casing, a plug rotatably mounted in said casing, a stem carried by said plug, a valve actuator, means carried by said casing supporting said actuator for rotation concentrically with said plug and fixed against axial movement, cooperating shank and socket means carried by said stem and actuator operable upon rotation of the actuator relative to the plug for moving the plug axially of the casing and adapted upon predetermined movement of the shank into the socket and on continued rotation of the actuator to rotate the plug, a pawl mounted on said stem for rotation therewith and movable axially thereof, a member fixed to the casing and encircling said stem, a plurality of ratchet elements disposed on said member and engageable by said pawl, said ratchet elements and pawl permitting rotation of said plug in one direction only from one of said ratchet elements to another and effecting partial removal of the actuator, and a spring urging said pawl in engagement with said ratchet.

2. A valve of the rotary, axially movable plug type comprising a valve body having a passageway extending therethrough, a rotary plug adapted to be seated and unseated in the valve body when moved axially, a valve seat extending transversely of the body, said valve seat being of greater length than the plug to allow axial movement of the plug, said plug in its seated position being in contact with the seat, said plug having a transverse passageway adapted to align with the passageway through said body, a frame mounted on said valve body, actuating means including a bushing rotatably mounted in said frame, a valve stem extending from said plug and having a threaded connection with said bushing so that rotation of said bushing relative to said stem effects axial movement of said stem to seat and unseat said plug, means carried by said stem and engageable with said bushing for coupling said stem and bushing for rotation together when said plug is unseated so that rotation of said bushing effects rotation of said plug, and means carried by said frame for opposing rotary movement of said stem in a direction opposite to the direction of rotation of said bushing to rotate the plug whereby when said bushing is rotated in the said opposite direction the plug is moved axially to reseated position.

3. A plug valve which comprises, in combination, a valve casing, a valve plug mounted in said casing for axial and turning movement, a valve actuator rotatably mounted on said casing and fixed against axial movement with respect thereto, connecting means between said actuator and said plug operable upon rotation of said actuator in one direction relative to said plug to axially move the latter from its seat and to turn the same with respect thereto and upon rotation in an opposite direction relative to the plug to axially move the latter axially into its seat, means for limiting relative rotation between the actuator and the plug, means carried by said casing and plug for preventing rotation of said plug in a direction opposite to the direction of rotation of said actuator to unseat said plug whereby when said actuator is rotated in said opposite direction the plug is moved axially without rotation to seated position, and for yieldably resisting rotation of the plug in the directional sense in which the actuator is rotated to move the plug from its seat.

4. A plug valve which comprises, in combination, a valve casing, a valve plug mounted in said casing for axial and turning movement, a valve actuator rotatably mounted on said casing and fixed against axial movement with respect thereto, a cooperating threaded shank and socket connection between said actuator and said plug operable upon rotation of said actuator in one direction to move the plug axially of its seat and to turn the same with respect thereto and upon rotation in the opposite direction to axially move said plug to its seat, means operable after the plug has been moved from its seat to limit relative rotation between the actuator and plug, and a detent mechanism including mutually engageable parts carried by said casing and said plug which when engaged are operable and effective to prevent turning of said plug in said opposite direction with said actuator from one predetermined operational position to another predetermined operational position.

5. The valve of claim 4 wherein said detent mechanism is a ratchet and pawl means carried by said plug and said casing, the last said means having stops engageable by said pawl at open and closed positions for the plug to prevent turning of the plug in said opposite direction from one of said positions to another of said positions.

6. The valve of claim 4 wherein said detent mechanism comprises a coil spring tightly wrapped about a stem extending coaxially from said plug with one end of said spring fixed against rotative movement with respect to said casing and the other end frictionally engaging the stem, said spring being wound around said stem in said opposite direction when viewed toward said frictionally engaging end and away from said fixed end so that turning of the stem and plug in said one direction tends to unwrap the spring from the stem and to reduce the friction therebetween permitting the stem and plug to rotate and so that when said plug and stem are urged to turn in said opposite direction, the spring engages the stem and limits turning of said plug.

7. A valve of the rotary, axially movable plug type comprising a valve casing having a passageway therethrough, a rotary plug adapted to be seated and unseated when moved axially, a valve seat for said plug extending transversely of said casing, said plug in seated position being in contact with said seat, said plug having a transverse passageway adapted to be aligned with the passageway through said casing, a valve actuator, means carried by said casing supporting said actuator for rotation and fixed against axial movement with respect to said casing, a threaded connection between said actuator and said plug so that rotation of the actuator relative to said plug effects axial movement of said plug to seat and unseat the same, means carried by said plug engageable with means carried by said actuator for limiting relative rotation between said plug and actuator by coupling them together after said plug has been unseated a predetermined extent so that rotation of said actuator will positively effect rotation of said plug and means carried by said casing for opposing rotary movement of said plug in a direction opposite to the direction of rotation of said actuator to unseat said plug whereby when said actuator is rotated in said opposite direction the plug is moved axially to seated position.

8. The valve of claim 7 wherein said rotary movement opposing means comprises a pawl and ratchet.

9. An actuating mechanism for a member adapted for axial and turning movements which comprises, in combination, an actuator rotatably mounted with respect to said member and fixed against axial movement, connecting means between said actuator and said member operable upon rotation of said actuator in one direction relative to said member to axially move the latter and to turn the same and upon rotation in an opposite direction relative to said member to move the latter axially and oppositely from first said axial movement, means for limiting relative rotation between the actuator and the member, and a detent mechanism operable and effective to prevent turning of said member with said actuator in said opposite direction from one predetermined operational position to another predetermined operational position.

10. An actuating mechanism for a member adapted for axial and turning movements which comprises, in combination, an actuator rotatably mounted on a support and fixed against axial movement, a cooperating threaded shank and socket connection between said actuator and said member operable upon rotation of said actuator in one rotational direction to move the member axially in a first axial direction and to turn the same and upon rotation in the opposite direction to move said member in an opposite axial direction, means operable after the member has been moved axially in said first axial direction to limit relative rotation between the actuator and the member, and a detent mechanism operable and effective to prevent turning of said member in said opposite direction with said actuator from a predetermined operating position to another predetermined operating position.

11. The mechanism of claim 10 wherein said detent mechanism is a ratchet and pawl means carried by said member and said support, the ratchet having stops at said operating positions to prevent turning of the member in said opposite direction from one of said positions to another of said positions.

12. A valve of the rotary, axially movable plug type comprising a valve body having a passageway extending therethrough and having a plug-receiving cavity intersecting said passageway, a rotary plug adapted to be seated and unseated in the cavity in the valve body when moved axially, said cavity being of greater length than the plug to allow axial movement of the plug, a valve seat carried by the wall of said cavity, said plug in its seated position being in contact with the seat, said plug having a transverse passageway adapted to align with the passageway through said body, a frame mounted on said valve body, actuating means including a bushing rotatably mounted in said frame, a valve stem extending from said plug and having a threaded connection with said bushing so that rotation of said bushing relative to said stem effects axial movement of said stem to seat and unseat said plug, means carried by said stem and engageable with said bushing for coupling said stem and bushing for rotation together when said plug is unseated so that rotation of said bushing effects rotation of said plug, and means carried by said frame for opposing rotary movement of said stem in a direction opposite to the direction of rotation of said bushing to rotate the plug whereby when said bushing is rotated in the said opposite direction the plug is moved axially to reseated position.

13. The valve of claim 3 wherein said means for preventing rotation and for yieldably resisting rotation of said plug comprises a pawl, a ratchet, and a spring urging said pawl toward engagement with said ratchet, the ratchet having a stop engageable by said pawl to positively prevent movement of said plug with said actuator in said opposite direction and having a part oppositely situated from said stop which, when said plug is turned in said one direction, moves said pawl against the urging force of said spring whereby the force of said spring must be overcome before said actuator can turn said plug.

HERBERT ALLEN.

REFERENCES CITED

The following references are of record in the file of this patent:

UNITED STATES PATENTS

| Number | Name | Date |
|---|---|---|
| 511,510 | Coale | Dec. 26, 1893 |
| 1,864,596 | Jones | June 28, 1932 |
| 2,064,765 | Powell | Dec. 15, 1936 |
| 2,139,632 | Flodin | Dec. 6, 1938 |
| 2,327,425 | Hilker | Aug. 24, 1943 |
| 2,408,223 | Nash | Sept. 24, 1946 |
| 2,464,123 | Downing | Mar. 8, 1949 |